United States Patent
Fujiwara et al.

(10) Patent No.: US 7,061,476 B2
(45) Date of Patent: Jun. 13, 2006

(54) PROJECTION DISPLAY APPARATUS

(75) Inventors: Shuichi Fujiwara, Nagano-ken (JP); Shoichi Akaiwa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 218 days.

(21) Appl. No.: 09/770,415

(22) Filed: Jan. 29, 2001

(65) Prior Publication Data

US 2001/0013843 A1 Aug. 16, 2001

Related U.S. Application Data

(63) Continuation of application No. PCT/JP00/03252, filed on May 19, 2000.

(30) Foreign Application Priority Data

May 27, 1999 (JP) .......................................... 11-148007

(51) Int. Cl.
*G09G 5/00* (2006.01)

(52) U.S. Cl. ........................................ 345/201; 345/2.2

(58) Field of Classification Search ................. 345/2.2, 345/9, 4, 418, 625, 629, 515, 630, 634; 348/211, 348/212, 722, 758, 776, 778; 353/34, 94, 353/82; 370/403–406; 701/115; 465/331; 709/226, 206; 52/82
See application file for complete search history.

(56) References Cited

U.S. PATENT DOCUMENTS

| | | | | |
|---|---|---|---|---|
| 3,985,431 A | * | 10/1976 | Lindstrom .................... | 353/94 |
| 4,086,005 A | * | 4/1978 | Honebrink et al. ......... | 352/133 |
| 4,800,376 A | | 1/1989 | Suga et al. | |
| 5,541,670 A | | 7/1996 | Hanai | |
| 5,724,775 A | * | 3/1998 | Zobel et al. ................... | 52/82 |
| 5,826,211 A | * | 10/1998 | Kobayashi .................. | 701/115 |
| 5,988,817 A | * | 11/1999 | Mizushima et al. .......... | 353/94 |
| 6,257,982 B1 | * | 7/2001 | Rider et al. .................... | 463/31 |
| 6,324,181 B1 | * | 11/2001 | Wong et al. ................ | 370/403 |
| 6,335,739 B1 | * | 1/2002 | Matsukura et al. ......... | 345/755 |
| 6,405,242 B1 | * | 6/2002 | Watanabe et al. ........... | 709/205 |

FOREIGN PATENT DOCUMENTS

| | | |
|---|---|---|
| EP | 0 425 989 | 5/1991 |
| EP | 0 498 995 | 8/1992 |
| JP | 62-163478 | 7/1987 |
| JP | 04-258099 | 9/1992 |
| JP | 07192656 | 7/1995 |
| JP | 8-79670 | 3/1996 |
| JP | 08-088820 | 4/1996 |
| JP | 9-331491 | 12/1997 |
| JP | 10-049068 | 2/1998 |
| JP | 10-124018 | 5/1998 |
| JP | 11-075145 | 3/1999 |
| JP | 2001268476 | * 9/2001 |
| WO | WO 99/04563 | 1/1999 |

* cited by examiner

*Primary Examiner*—Vijay Shankar
*Assistant Examiner*—Prabodh M. Dharia
(74) *Attorney, Agent, or Firm*—Oblon, Spivak, McClelland, Maier & Neustadt, P.C.

(57) ABSTRACT

A technique to adjust each projector of a multi-projector system by simple operations when an identical image is projected on a screen by a plurality of projectors. A communication control unit controls serial communications with an external device through a serial communication port P1 or P2. When receiving a stack definition packet through the serial communication port P1, a control unit stores ID information into a memory based on number information that represents a number of working projectors included in the input stack definition packet, increments the number information in the stack definition packet, and transmits the updated stack definition packet through the serial communication port P2. In response to a command input through the serial communication port P1, the control unit determines whether or not an address of the input command designates itself as the projector of interest, based on address information included in the command and the ID information stored in the memory. If the address of the command does designate itself as the projector of interest, the control unit carries out a processing specified by the command.

20 Claims, 6 Drawing Sheets

PROJECTION DISPLAY APPARATUS

CROSS-REFERENCE TO RELATED DOCUMENTS

The present document is a continuation of application PCT/JP00/03252 filed May 19, 2000 and JP 11-148007, the entire contents of each of which are hereby incorporated herein by reference.

BACKGROUND OF THE INVENTION

1. Field of the Invention

The present invention relates to a projection display apparatus that projects an image on a screen.

2. Discussion of the Background

Projection display apparatuses have widely been used, for example, for presentation in spacious rooms. Improvements have been made in lamps for image projection and liquid-crystal panels included in such projection display apparatuses (hereinafter simply referred to as projectors). A diversity of projectors have accordingly been developed to display images of high luminance and high picture quality without any noticeable flickering.

In the case in which a picture image is projected on a screen in a spacious event hall, the use of only one projector may not give the projected image sufficient brightness and may result in unclearness of the projected image.

One method of solving that problem is to provide a plurality of projectors and to project an identical picture image on the same screen with each of the plurality of projectors.

That method, however, disadvantageously requires labor-consuming and time-consuming adjustments including adjustment of contrast in each of the plurality of projectors.

SUMMARY OF THE INVENTION

One object of the present invention is thus to provide a novel projection display apparatus that is adjustable by simple operations in the case in which an identical picture image is projected on the same screen by each of a plurality of projection display apparatuses.

The present invention can achieve the above objective by providing a novel projection display apparatus which includes a communication control section that controls communication with an external device via either one of a first communication port and a second communication port. A control section stores, in a storage device, and in response to an initialization signal input via the first communication port, ID information corresponding to the initialization signal, updates the initialization signal according to a predetermined rule, and transmits the updated initialization signal via the second communication port. In response to a command input via the first communication port, the control section determines whether or not an address of the command designates itself as the projection display apparatus of interest, based on address information included in the command and the ID information stored in the storage section. If the address of the command does designate itself as the projection display apparatus of interest, the control section carries out a processing specified by the command.

A plurality of the projection display apparatuses having the above configuration can be connected in series, such that a first communication port of a second projection display apparatus is connected with a second communication port of a first projection display apparatus and a first communication port of a third projection display apparatus is connected with a second communication port of the second projection display apparatus. When the initialization signal is input to the first projection display apparatus, this arrangement of the present invention enables the ID information to be stored in the storage section of each projection display apparatus. In this state, when a command including address information to specify a desired projection display apparatus is input to the first projection display apparatus, the command goes to the desired projection display apparatus specified by the address information included in the command. The control section of the desired projection display apparatus then carries out the processing specified by the command.

In accordance with one preferable application of the present invention, the control section transmits return information, which represents a result of the processing specified by the input command, via the first communication port after the processing has been completed. If the control section receives the return information given via the second port, the control section transmits via the first communication port the return information given via the second communication port.

In this application, the result of the processing specified by the command is returned to the transmission source of the command. This arrangement facilitates the management of the respective projection display apparatuses at the transmission source.

In one preferred embodiment, the projection display apparatus further includes a command input section other than the first and second communication ports. In this structure, the control section carries out a processing specified by a command input via the command input section only when an initialization signal having prescribed contents is input via the first communication port. The control section neglects the command input via the command input section, on the other hand, when the input initialization signal has no prescribed contents.

This arrangement restricts the address of the command input to the specified projection display apparatus and effectively prevents any non-selected projection display apparatus from unintentionally receiving the command.

In one preferable application of this embodiment, when the initialization signal having the prescribed contents is input via the first communication port and a predetermined command is input via the command input section, the control section carries out a control to display an onscreen display menu that allows an input of commands addressed to an arbitrary one of a plurality of projection display apparatuses including the projection display apparatus of interest.

This arrangement facilitates the command input into any of the plurality of projection display apparatuses.

In another preferable application of this embodiment, when the initialization signal having the prescribed contents is input via the first communication port, the control section transmits via the second communication port a piece of information that specifies either one of a type of an image signal supplied externally and a method of signal processing to be applied for the supplied image signal. When the initialization signal having the prescribed contents is not input via the first communication port, on the other hand, the control section receives via the first communication port the piece of information that specifies either one of the type of image signal supplied externally and the method of signal processing to be applied for the supplied image signal, and controls a signal processing applied for the supplied image signal according to the received piece of information.

Such an arrangement enables the identical method of signal processing to be applied for processing the image signal in the respective projection display apparatuses.

In accordance with another preferable application of the present invention, the projection display apparatus further includes a plurality of image signal input ports that receive image signals. In that structure, the control section selects an image signal given from one of the plurality of image signal input ports and controls projection and display of an image expressed by the selected image signal in response to a command input via the first communication port.

That arrangement arbitrarily selects one among a plurality of image sources and enables a desired image to be projected with a plurality of the projection display apparatuses.

In accordance with still another preferable application of the present invention, the control section has a delay control section that delays an execution timing of a processing specified by a command input via the first communication port according to the ID information stored in the storage section.

Such an arrangement equalizes the execution timing of the series of processings specified by the command in the respective projection display apparatuses.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

One mode of carrying out the present invention is described below as a preferred embodiment with reference to the drawings, in which like reference numerals designate identical or corresponding parts throughout the several views.

Figure 1:
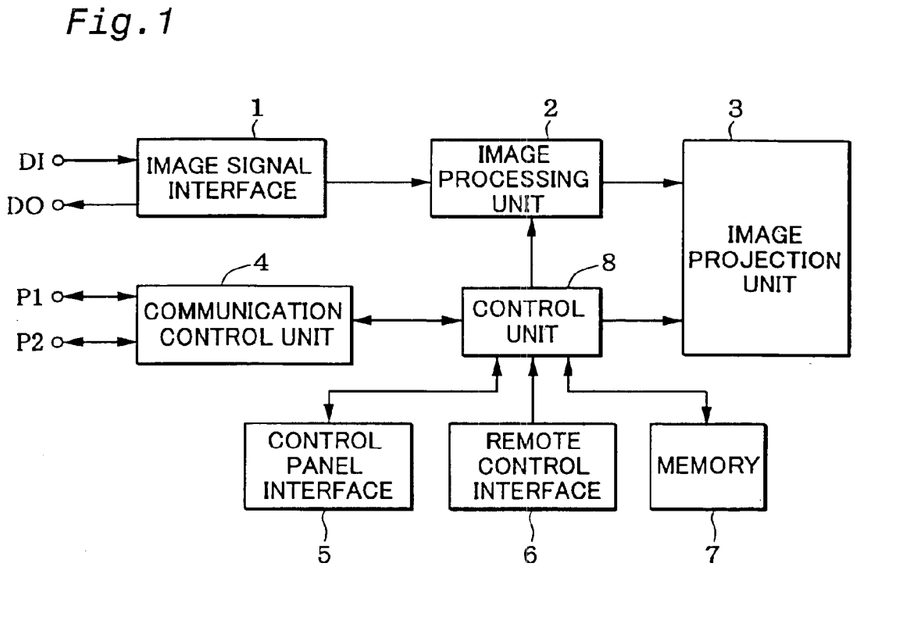
FIG. 1 is a block diagram illustrating the structure of a projector in one embodiment of the present invention.

FIG. 1 is a block diagram illustrating the structure of a projector in one embodiment of the present invention. In the illustrated structure, an image signal interface 1 receives image signals supplied from an external image source (not shown) via an image signal input port DI and gives the received image signals to an image processing unit 2. The image signal interface 1 also allows the image signals input into the image signal input port DI to be directly output from an image signal output port DO.

The image processing unit 2 carries out various series of signal processings for the image signals supplied via the image signal interface 1, generates image data representing an image of interest, which is an object of projection, and stores the generated image data into a frame memory (not shown).

An image projection unit 3 projects an image corresponding to the image data stored in the frame memory of the image processing unit 2 onto a non-illustrated screen and includes, for example, illumination lamps and liquid-crystal panels.

A communication control unit 4 controls serial communications via two serial communication ports P1 and P2.

A control panel interface 5 detects operation events of various switches (not shown) disposed on a control panel of the projector and controls lighting of indicators, such as LEDs (not shown), disposed on the control panel.

A remote control interface 6 receives an infrared signal transmitted from a non-illustrated remote control and demodulates a command from the given infrared signal.

A memory 7 is a non-volatile memory constructed by, e.g., a static RAM or an EEPROM having backup power supply (not shown), and functions to store a diversity of control programs and various of control information.

A control unit 8 is the control center of the projector and controls the respective constituents of the projector according to the diversity of control programs stored in the memory 7.

A stack control task is one of the control tasks executed by the control unit 8. The stack control task is characteristic of this embodiment and is provided specifically for working conditions that a plurality of projectors including this projector project an identical image. The details of the stack control task are discussed later.

A user may provide a plurality of the projectors having the arrangement of this embodiment of FIG. 1 and project an identical image from each of the plurality of the projectors.

Figure 2:
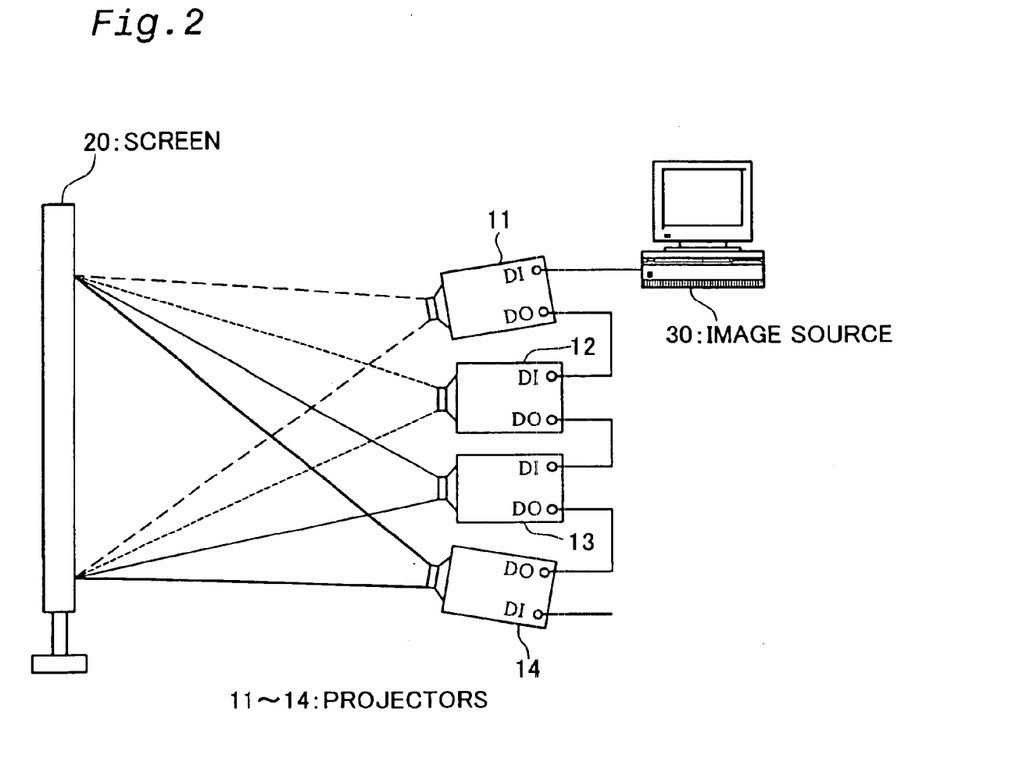
FIG. 2 illustrates the structure of one projection system including a plurality of projectors.
Figure 3:
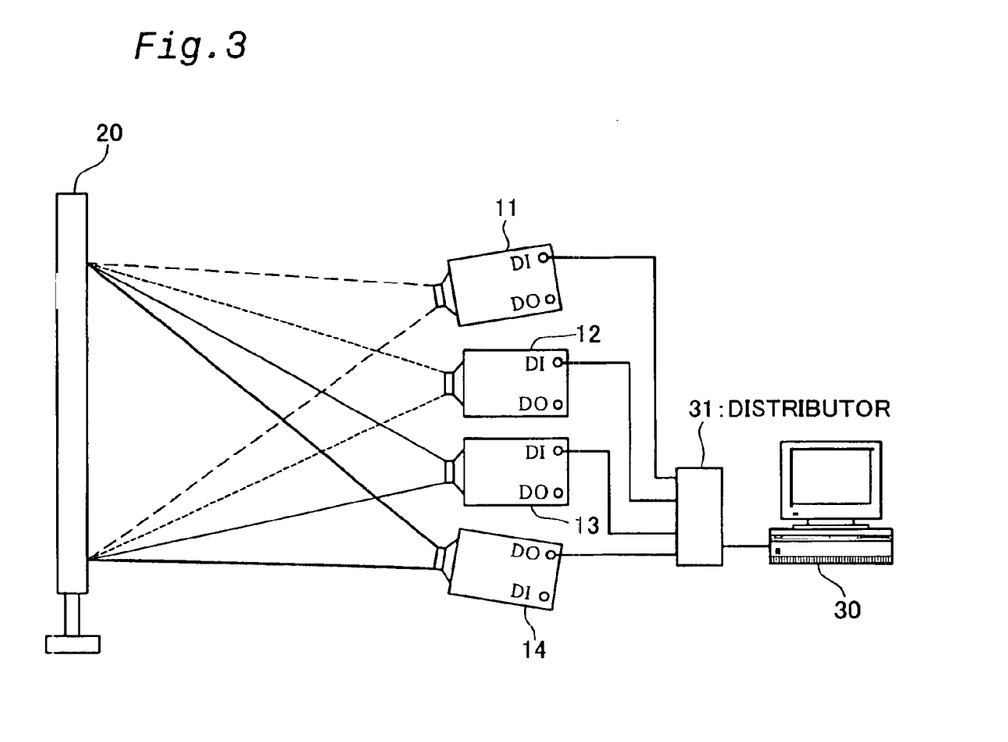
FIG. 3 illustrates the structure of another projection system including a plurality of projectors.

When the identical image is projected from each of the plurality of projectors, it is required to connect an image source with the respective projectors. FIGS. 2 and 3 show examples of such a connection.

The illustrated example of FIG. 2 includes projectors 11 through 14 having the arrangement of this embodiment, a screen 20, and an image source 30, which may be, e.g., a personal computer or a video player, to supply image signals to the respective projectors 11–14.

In the example of FIG. 2, the image source 30 and the respective projectors 11 through 14 are connected in series via communication cables. In the state of serial connection, an image signal output from the image source 30 is supplied to the image signal input port DI of the projector 11. The image signal is taken into the image processing unit 2 via the image signal interface 1 included in the projector 11, and an image corresponding to the image signal is projected onto the screen 20 by its image projection unit 3. The image signal interface 1 on the projector 11 also causes the image signal input into its image signal input port DI to be output directly from its image signal output port DO. That output image signal is then supplied to the image signal input port DI of the next projector 12. Similar operations proceed in the respective projectors 12, 13, and 14. The image signal output from the image source 30 is thus supplied to the respective projectors serially in the sequence of 11→12→13→14. An identical image is then projected from each of these projectors.

In the illustrated example of FIG. 3, the respective projectors 11 through 14 are connected in parallel with the image source 30 via a distributor 31. In this example, the distributor 31 distributes an image signal output from the image source 30 into the respective image signal input ports DI of each of the projectors 11 through 14. Each projector 11–14 projects an image onto the screen 20 in response to the image signal given to its own respective image signal input port DI.

In the case in which a plurality of projectors are used for projection as in the illustrated examples of FIGS. 2 and 3, in order to obtain a clear projected image, the respective projectors should project an identical image on an identical area on the screen 20. For this purpose, it is required to adjust the attitude, the direction of projection, the range of projection, and the shape of the projected image with regard to each projector. In some cases, in order to adjust the contrast of the image currently being projected on the screen, it is also required to vary a specific control parameter in all the projectors or to vary a specific control parameter in a specific projector.

In a background art system, the user carries out the adjustments and the variations through operations of the corresponding switches on the control panel in the projector of interest. Such labor-consuming and time-consuming operations are, however, rather inconvenient in the case in which a plurality of projectors are used for projection.

The arrangement of the embodiment of the present invention enables a desired command to be given to all the projectors or to only a desired projector by simply carrying out required operations to input the command into a representative projector among the plurality of projectors. In order to realize such an arrangement, it is required to connect the respective projectors as in the illustrated example of FIG. 4.

Figure 4:
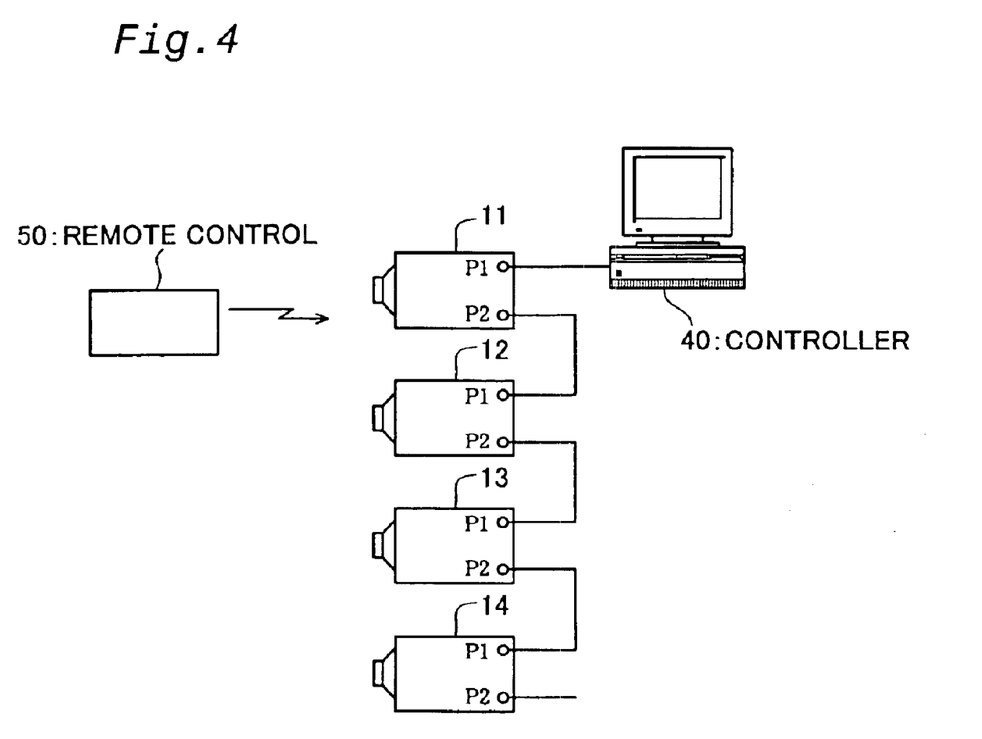
FIG. 4 shows the structure of a transmission system of control commands in the projection system.

In the example of FIG. 4, a serial communication port of a controller 40, for example a personal computer, is connected to a serial communication port P1 of projector 11 via a communication cable, and a serial communication port P2 of the projector 11 is connected to a serial communication port P1 of projector 12 via a communication cable. In a similar manner, four projectors 11 through 14 are serially connected via the respective serial communication ports P1 and P2 in the example of FIG. 4.

In this state of serial connection, the projector 11 functions as representative of all the projectors to receive commands and manage the respective projectors. In the arrangement of this embodiment, such a projector 11 operates as a referred to master projector.

The other projectors 12 through 14 serially connected with the projector 11, i.e. the master projector, receive commands via the master projector and are, from this point of view, under the control of the master projector. In the arrangement of this embodiment, these projectors 12–14 are referred to as slave projectors.

In the state of connection shown in FIG. 4, the user gives a desired universal command to all the projectors 11 through 14 or a specific command to any desired projector via the projector 11 (master projector) through operations of a remote control 50 or operations of switches on a control panel. In the case of connection with the controller 40 as shown in FIG. 4, the user transmits a command from the controller 40 to all the projectors 11 through 14 or any desired projector.

The state that ensures the command transfer among a plurality of projectors is referred to as the stack state in this embodiment. In the example of FIG. 4, the projector 11 functions as the master projector, whereas the other projectors 12 through 14 function as the slave projectors. The command is transmitted to the respective projectors in the sequence of the projectors 12→13→14 via the projector 11. The structure of this command transmission system is referred to as the stack structure in this embodiment.

The stack control task mentioned above sets each projector in this stack state and controls operations of the respective projectors in the stack state.

The following describes the operations of the embodiment of the present invention of FIG. 4, and especially the operations relating to the stack control task.

(1) Introduction Process and Stack State Control

In order to send a command to a desired projector in the state of serial connection of the respective projectors as illustrated in FIG. 4, the required procedure specifies the stack structure in advance, teaches each projector its identification (as either the master projector or a slave projector, and its position in the case of a slave projector), and enables each projector to carry out controls according to its identification. The series of processings for this purpose is referred to as the introduction process in this embodiment. The processing carried out by the control unit 8 in each projector 8 in the introduction process is referred to as the stack state control.

Figure 5:
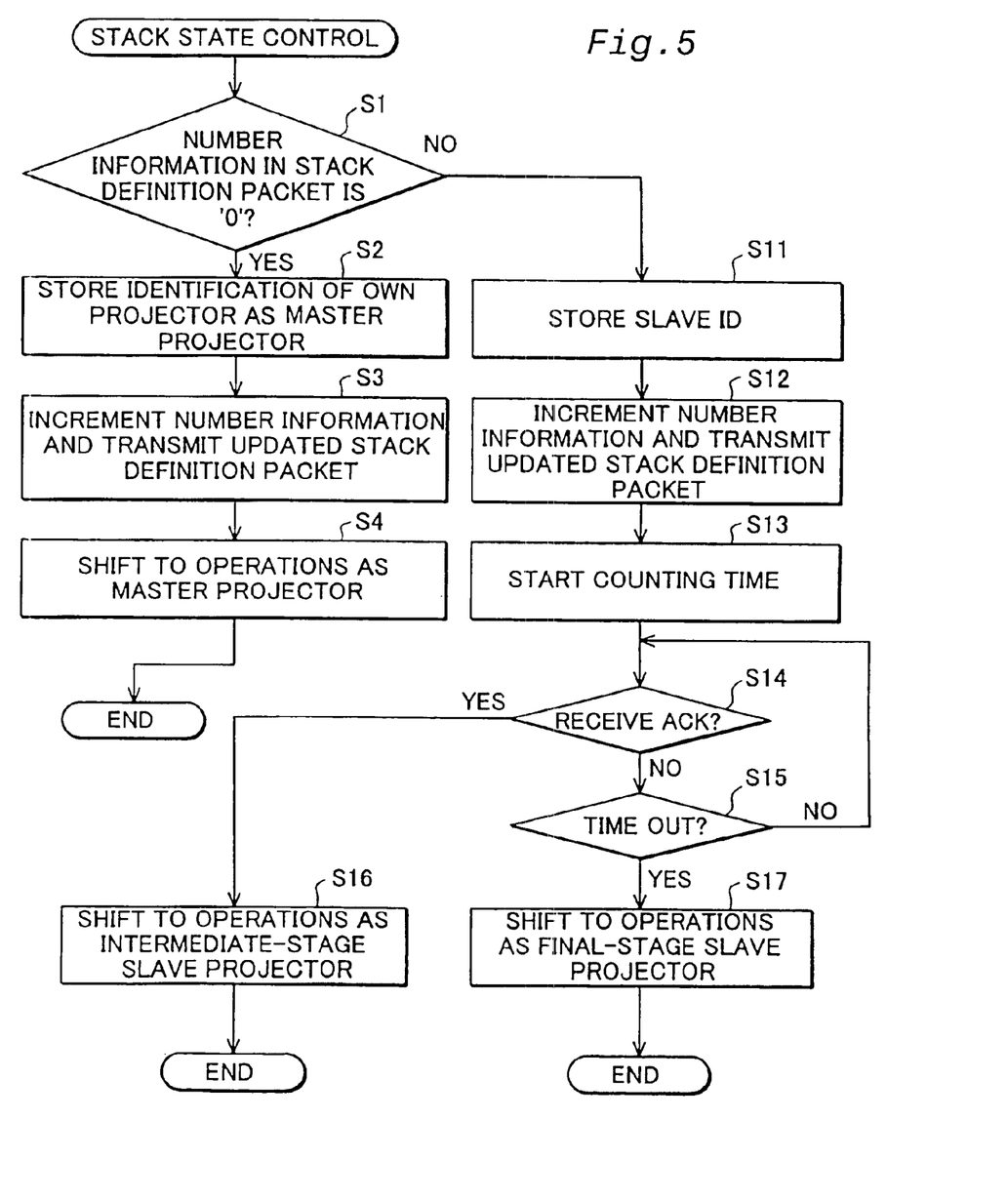
FIG. 5 is a flowchart showing a processing routine executed by the control unit of the embodiment.

FIG. 5 is a flowchart showing a routine of this stack state control.

In the introduction process, the controller 40 transmits a stack definition packet as an initialization signal. The stack definition packet includes number information, which represents the number of working projectors. In the initial stage on transmission from the controller 40, the number information is set equal to "0".

In the state of connection shown in FIG. 4, the projector 11 first receives this stack definition packet.

In response to the input of the stack definition packet via its serial communication port P1, the control unit 8 in the projector 11 sends back an ACK signal (acknowledge signal) to the controller 40 via its serial communication port P1 and starts the routine of FIG. 5.

The control unit 8 of projector 11 first determines at step S1 whether or not the number information included in the stack definition packet is equal to "0". Here the decision gives "YES", and the program proceeds to step S2 in which the control unit 8 recognizes itself (its own projector 11) as the master projector and stores ID information representing that fact into its memory 7.

At subsequent step S3, the control unit 8 of projector 11 increments the number information to "1" and outputs the updated stack definition packet, which includes the incremented number information, via its serial communication port P2.

The control unit 8 then shifts its operations to those of a master projector (step S4), and exits from this stack state control routine.

The stack definition packet transmitted from the serial communication port P2 of the projector 11 is supplied to the serial communication port P1 of the subsequent projector 12. In response to the input of this stack definition packet, the control unit 8 in the projector 12 sends back the ACK signal to the projector 11 via its serial communication port P1 and starts the stack state control routine shown in FIG. 5.

Here the number information included in the given stack definition packet for the next projector 12 is equal to "1". As a result, the decision at step S1 accordingly is "NO", and the program proceeds to step S11 for projector 12 in which its control unit 8 recognizes itself (its own projector 12) as a slave projector and stores the number information "1" as its slave ID into its memory 7.

At subsequent step S12, the control unit 8 of projector 12 increments the number information to "2" and outputs the updated stack definition packet, which includes the incremented number information, via the serial communication port P2 to the next projector, if there is a next projector.

The control unit 8 then starts counting a preset time (step S13) and repeatedly determines whether or not the ACK signal is received from a next projector via its serial communication port P2 until the preset time has elapsed (steps S14 and S15).

In the case in which the ACK signal is received before the time out, "YES" in step S14, the control unit 8 recognizes itself (its own projector 12) not as the final-stage slave projector but as an intermediate slave projector, writes the information regarding this fact into its memory 7, and shifts to operations of an intermediate slave projector (step S16), before exiting from this stack state control routine.

In the state of connection shown in FIG. 4, the serial communication port P2 of the projector 12 is connected with the serial communication port P1 of the projector 13. The serial communication port P2 of the projector 13 is connected with the serial communication port P1 of the projector 14. The projectors 12 and 13 accordingly receive the ACK signal unless any special circumstances arise, for example, ceased communication functions of the subsequent projector. The processing of step S 16 is thus executed in the case of the projectors 12 and 13.

In the example of FIG. 4, the serial communication port P2 of the projector 14 has no connection. When the projector 14 receives the stack definition packet and its control unit 8 executes the stack state control routine, the ACK signal will not be received at step S14 before the time out, i.e. for projector 14 the state control routine outputs "NO" in step S14 and "YES" in step S15, and then proceeds to step S17. The program accordingly proceeds to step S17 in which the control unit 8 regards itself (its own projector 14) as the final-stage slave projector, writes the information regarding this fact into its memory 7, and shifts to operations as a final-stage slave projector. At step S17, the control unit 8 also transmits a return packet, which includes the slave ID (in this case, "3") of itself, via the serial communication port P1. The return packet is relayed by the projectors 13, 12, and 11, which are located before the projector 14, and returned to the controller 40. The controller 40 can thereby specify the number of connected projectors, based on the contents of the return packet. The controller 40 gives an error display when the return packet has not been received before the elapse of a preset time since the transmission of the stack definition packet. There are some possible causes of such failure; for example, the master projector may not be normally connected to the controller 40.

On conclusion of the processing of step S17, the control unit 8 of the projector 14 exits from the stack state control routine.

(2) Command Process

On completion of the series of introduction processes discussed above, the master projector, as representative of all the projectors, receives commands and transmits the commands to the slave projectors according to requirements.

The user can give commands to any desired projector via the master projector. The commands are given to the master projector, for example, through operations of switches on the control panel of the master projector, through transmission of infrared signals from the remote control 50 to the master projector, or through operations of the controller 40.

In the structure of the embodiment of the present invention, in order to ensure the sufficient functions of the master projector, a display control program of an OSD menu, which is executed when a projector is identified as the master projector, is stored in the memory 7 of the master projector.

In response to a preset command input from the remote control 50, the control unit 8 of the projector identified as the master projector gives an instruction to its image processing unit 2 to display an OSD (onscreen display) menu exclusively used for the stack state according to the display control program. The contents of the OSD menu are different from those displayed by the projector if the projector is used in the stand-alone state, and enable the user to input a command, which is addressed to a desired projector among all the projectors in the stack state. For example, in the case in which a command input through operations of the remote control requires adjustment of the volume in a projector, the master projector displays the projected OSD menu for the stack state, which includes a bar graph representing the current volume of each projector. The user checks the bar graph, and specifies a desired projector and sends a command to the desired projector to regulate its volume through the master projector through operations of the remote control.

In the projectors identified as slave projectors, their control units 8 mask the output signals of their control panel interfaces 5 and their remote control interfaces 6 and do not carry out any processings in response to the operations of the switches on their control panels or the infrared signals transmitted from the remote control 50. Only the master projector is accordingly effective in the stack state for the command input through the operations of the control panel or the operations of the remote control 50.

Here the commands include broadcast commands addressed to all the projectors in the stack state and commands addressed to specific projectors. Each command addressed to a specific projector includes address information showing that the address of the command is either the master projector or the slave projector. In the latter case, the address information further includes the slave ID of the slave projector, to which the command is addressed.

Any command is first input into the master projector and eventually reaches the addressed projector via one or a plurality of slave projectors according to the requirement of the command.

Figure 6:
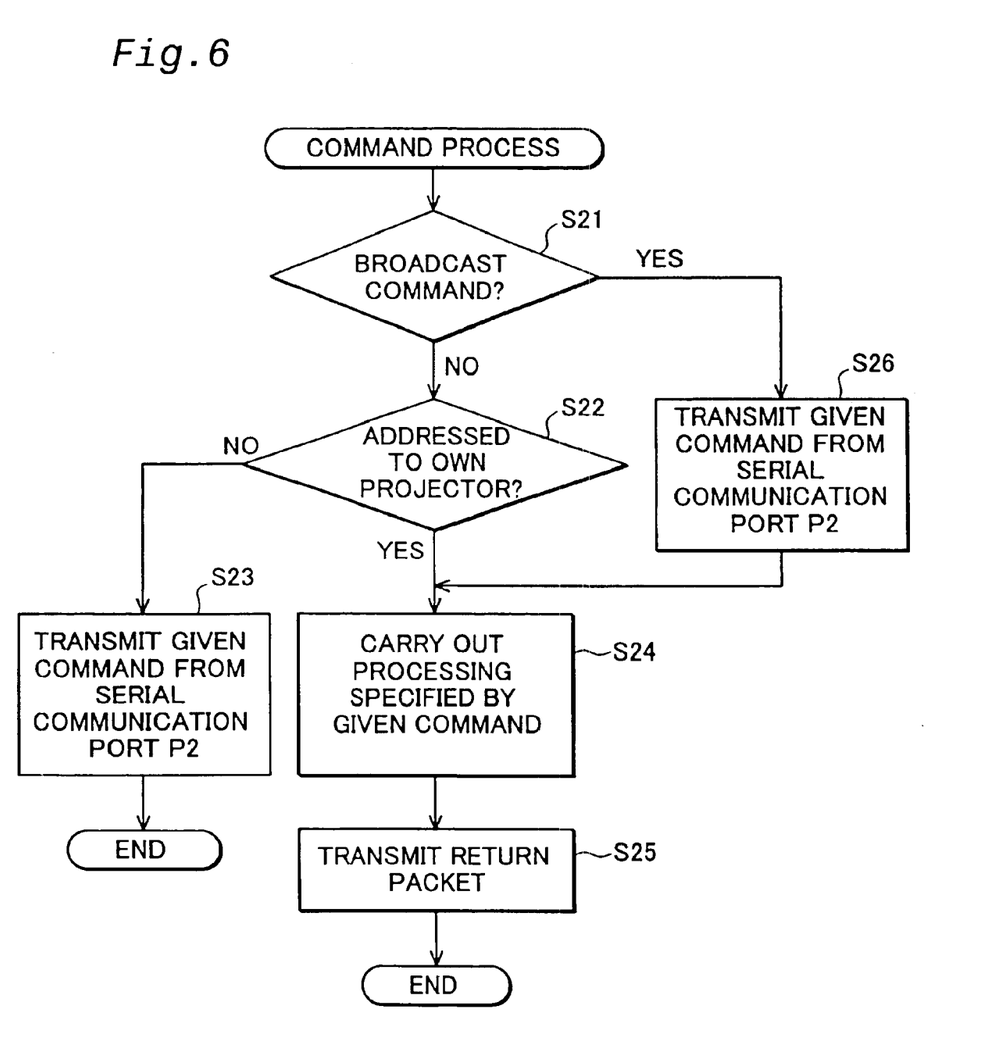
FIG. 6 is a flowchart showing another processing routine executed by the control unit of the embodiment.

FIG. 6 is a flowchart showing the details of a command process routine executed by a projector that receives a command via the serial communication port P1.

The control unit 8 in the projector in question, which has just received the command, first determines whether or not the input command is a broadcast command to be sent to all the projectors (step S21). When the decision gives "NO", the program proceeds to step S22 in which the control unit 8 determines whether or not the address of the received command is itself. In the case in which the address is a specific slave projector and the projector in question is a slave projector, the control unit 8 refers to the slave ID stored in its memory 7 to make the decision at step S22. When the decision at step S22 gives "NO", the program proceeds to step S23 in which the control unit 8 transmits the received command to the next projector via its serial communication port P2, and exits from the command process routine.

The processings discussed above cause the command given into the master projector to reach the addressed projector via one or a plurality of projectors.

In the case in which the address of the received command is its own projector, i.e. the projector in question, the decision at step S22 gives "YES". The program then proceeds to step S24 in which the control unit 8 carries out a series of processings specified by the received command, for example adjustment of control parameters in its image processing unit 2 and its image projection unit 3.

The program subsequently proceeds to step S25 in which the control unit 8 outputs a return packet, which includes results of the processing specified by the received command, via its serial communication port P1. The return packet is relayed to the master projector and further sent to the controller 40. The master projector and the controller 40 check whether or not the series of processings specified by the command has been carried out normally, based on the contents of the return packet. On completion of the process of step S25, the control unit 8 exits from the command process routine.

In the case in which the received command is a broadcast command, the decision at step S21 gives "YES". In that case, the program proceeds to step S26 in which the control unit 8 transmits the received command via its serial communication port P2. After the transmission, the control unit 8 carries out the series of processings specified by the received command (step S24).

In the course of carrying out the series of processings specified by the broadcast command at step S24, the control unit 8 refers to the ID information (either the information representing the identification as the master projector or the slave ID) and carries out a delay control to delay the execution timing of the series of processings specified by the command. If each projector immediately starts the series of processings in response to the received broadcast command, the end timing of the processing specified by the broadcast command is varied among the respective projectors. This may cause an abnormality of the resulting projected image. The procedure thus adjusts the start timing of the processing, in order to ensure the identical end timing of the processing among the respective projectors.

On completion of the processing specified by the command, the control unit 8 transmits the return packet (step S25) and exits from the command control routine.

The command process is carried out in the above manner in this embodiment.

In the arrangement of the embodiment, the series of command processes discussed above is carried out in the respective projectors connected in series. This arrangement enables the user to send any desired command to all the projectors or any desired specific projector and carry out any required operations, for example, on/off operations of lamps and adjustments of contrast, brightness, and color of the image, with regard to all the projectors or any specific projector. For this purpose, the user simply inputs the command, which is addressed to all the projectors or any desired projector, into the master projector through operations of the remote control 50 or the controller 40. This arrangement advantageously saves labor and time in command inputs.

(3) Processing of Image Signals

The control unit 8 included in the projector which is identified as the master projector in the stack state (projector 11 in the above example), specifies the type of the image signals given from the image signal input port DI (for example, SVGA) and requests its image processing unit 2 to carry out a process of signal conversion that converts the image signals into another signal representation suitable for display.

The control unit 8 in the master projector also transmits the information, which has been given via its image signal input port DI and represents the type of the image signal or the process of signal conversion, from its serial communication port P2 to the slave projectors.

The control unit 8 in each slave projector receives this information via its respective serial communication port P1, specifies the process of signal conversion carried out in the master projector based on the input information, and requests its respective image processing unit 2 to carry out the same process of signal conversion.

In this manner, the technique of the embodiment enables all the projectors in the stack state to carry out the identical processes of signal conversion with regard to the image signals.

(4) Switchover Process of Image Source

The projector shown in FIG. 1 has only one image signal input port DI. In one possible modification, one projector has a plurality of image signal input ports, and each control unit 8 executes the additional control function to select image signals input via a desired image signal input port and supply the selected image signals to its image processing unit 2. This modified arrangement enables switchover of the image source.

A plurality of the projectors having such a modified structure are connected in series as illustrated in FIG. 4, and image signals are supplied from a plurality of image sources to the individual projectors. In such a structure, the user gives a broadcast command for selecting a desired image signal input port to the master projector. Such an arrangement enables the image from a desired image source to be projected by all the projectors.

(5) Operations for Restarting

When the power source of each projector is once turned off and then again turned on after completion of the series of introduction processes discussed above, a restarting process is carried out in each projector.

In the restarting process, in the same manner as the introduction process discussed above, the stack definition packet is transmitted from the controller 40 and transferred to the respective projectors in the sequence of the projectors 11→12→13→14 in the state of connection shown in FIG. 4. The stack state control process shown in FIG. 5 is then executed again in each projector. At this moment, each projector compares the newly received number information with the ID information stored in its respective memory 7 (either the information representing the identification as the master projector or the slave ID) and determines whether or not there is any conflict. For example, in the case in which for a projector the currently received number information is equal to "2" while the slave ID stored in the memory 7 is equal to "1", the projector transmits the return packet representing the conflict via the serial communication port P1. The return packet is given back to the master projector and the controller 40 for error display. Such conflict occurs when there is any change in connection of the respective projectors between the introduction process and the current restarting process. The user accordingly checks the state of connection and rearranges the connection if required.

The embodiment discussed above transmits commands and responses through serial communications between the controller and the individual projectors. One possible modification carries out the transmission through parallel communications between the controller and the individual projectors.

As described above, the arrangement of the present invention effectively facilitates the adjustment of each projection display apparatus when an identical image is projected with a plurality of projection display apparatuses.

The principle of the present invention is applicable to a projection system including a plurality of projection display apparatuses.

Obviously, numerous additional modifications and variations of the present invention are possible in light of the above teachings. It is therefore to be understood that within the scope of the appended claims, the present invention may be practiced otherwise than as specifically described herein.

What is claimed is:

1. A projection display apparatus, comprising:
a communication control section configured to control communication with an external device by at least one of a first communication port and a second communication port, the second communication port adapted to be connected to an additional projection display apparatus;
a storage section; and
a control section configured to, in response to an initialization signal input through the first communication port, store ID information in the storage section regarding an identity of the projection display apparatus based on the initialization signal, update the initialization signal according to a predetermined rule, and transmit the updated initialization signal through the second communication port, the control section further configured to, in response to a command input through the first communication port, determine whether or not the command is directed to itself as a projection display apparatus of interest, based on address information included in the command and the ID information stored in the storage section, and the control section is further configured to carry out a processing specified by the command if the command is directed to itself as the projection display apparatus of interest.

2. A projection display apparatus in accordance with claim 1, wherein the control section is further configured to transmit return information, which represents a result of the processing specified by the given command, through the first communication port after the processing has been completed, and if the control section receives return information input through the second communication port, the control section transmits through the first communication port the return information given through the second communication port.

3. A projection display apparatus in accordance with claim 2, further comprising a command input section, and wherein the control section carries out processing specified by the command input through the command input section only when an initialization signal having prescribed contents is input through the first communication port, the control section neglecting the command given through the command input section when the input initialization signal has no prescribed contents.

4. A projection display apparatus in accordance with claim 3, wherein when the initialization signal having the prescribed contents is input through the first communication port and a predetermined command is input through the command input section, the control section carries out a control to display an onscreen display menu to allow input of commands addressed to an arbitrary one of a plurality of projection display apparatuses including the projection display apparatus of interest.

5. A projection display apparatus in accordance with claim 3, wherein when the initialization signal having the prescribed contents is input through the first communication port, the control section transmits through the second communication port a piece of information that specifies at least one of a type of image signal supplied externally and a method of signal processing to be applied for the supplied image signal, when the initialization signal having the prescribed contents is not input through the first communication port, the control section receives through the first communication port the piece of information that specifies at least one of the type of image signal supplied externally and the method of signal processing to be applied for the supplied image signal and controls a signal processing applied for the supplied image signal according to the received piece of information.

6. A projection display apparatus in accordance with of claim 1, further comprising a command input section, and wherein the control section carries out processing specified by the command input through the command input section only when an initialization signal having prescribed contents is input through the first communication port, the control section neglecting the command given through the command input section when the input initialization signal has no prescribed contents.

7. A projection display apparatus in accordance with claim 6, wherein when the initialization signal having the prescribed contents is input through the first communication port and a predetermined command is input through the command input section, the control section carries out a control to display an onscreen display menu to allow input of commands addressed to an arbitrary one of a plurality of projection display apparatuses including the projection display apparatus of interest.

8. A projection display apparatus in accordance with claim 6, wherein when the initialization signal having the prescribed contents is input through the first communication port, the control section transmits through the second communication port a piece of information that specifies at least one of a type of image signal supplied externally and a method of signal processing to be applied for the supplied image signal, when the initialization signal having the prescribed contents is not input through the first communication port, the control section receives through the first communication port the piece of information that specifies at least one of the type of image signal supplied externally and the method of signal processing to be applied for the supplied image signal and controls a signal processing applied for the supplied image signal according to the received piece of information.

9. A projection display apparatus in accordance with claim 4, further comprising a plurality of image signal input ports configured to receive image signals, wherein the control section selects an image signal input from one of the plurality of image signal input ports and controls projection and display of an image expressed by the selected image signal in response to a command given through the first communication port.

10. A projection display apparatus in accordance with claim 1, wherein the control section is further configured to delay an execution timing of the processing specified by the command given through the first communication port according to the ID information stored in the storage section.

11. A projection display apparatus, comprising:
communication control section means for controlling communication with an external device by at least one of a first communication port means and a second communication port means, the second communication port means for connecting to an additional projection display apparatus;
storage means; and
control means for, in response to an initialization signal input through the first communication port means, storing ID information in the storage means regarding an identity of the projection display apparatus based on the initialization signal, updating the initialization signal according to a predetermined rule, and transmitting the updated initialization signal through the second communication port means, the control means further for, in response to a command input through the first communication port means, determining whether or not the command is directed to itself as a projection display apparatus of interest, based on address information included in the command and the ID information stored in the storage means, and for further carrying out a processing specified by the command if the command is directed to itself as the projection display apparatus of interest.

12. A projection display apparatus in accordance with claim 11, wherein the control mean further transmits return information, which represents a result of the processing specified by the given-command, through the first communication port means after the processing has been completed, and if the control means receives return information input through the second communication port means, the control means transmits through the first communication port means the return information given through the second communication port means.

13. A projection display apparatus in accordance with of claim 12, further comprising command input means for inputting a command, and wherein the control means carries out processing specified by the command input through the command input means only when an initialization signal having prescribed contents is input through the first communication port means, the control means neglecting the command given through the command input means when the input initialization signal has no prescribed contents.

14. A projection display apparatus in accordance with claim 13, wherein when the initialization signal having the prescribed contents is input through the first communication port means and a predetermined command is input through the command input means, the control means controls to display an onscreen display menu to allow input of commands addressed to an arbitrary one of a plurality of projection display apparatuses including the projection display apparatus of interest.

15. A projection display apparatus in accordance with claim 13, wherein when the initialization signal having the prescribed contents is input through the first communication port means, the control means transmits through the second communication port means a piece of information that specifies at least one of a type of image signal supplied externally and a method of signal processing to be applied for the supplied image signal, when the initialization signal having the prescribed contents is not input through the first communication port means, the control means receives through the first communication port means the piece of information that specifies at least one of the type of image signal supplied externally and the method of signal processing to be applied for the supplied image signal and controls a signal processing applied for the supplied image signal according to the received piece of information.

16. A projection display apparatus in accordance with claim 11, further comprises command input means for inputting a command, and wherein the controls means carries out processing specified by the command input through the command input means only when an initialization signal having prescribed contents is input through the first communication port means, the control means neglecting the command given through the command input means when the input initialization signal has no prescribed contents.

17. A projection display apparatus in accordance with claim 16, wherein when the initialization signal having the prescribed contents is input through the first communication port means and a predetermined command is input through the command input means, the control means controls to display an onscreen display menu to allow input of commands addressed to an arbitrary one of a plurality of projection display apparatuses including the projection display apparatus of interest.

18. A projection display apparatus in accordance with claim 16, wherein when the initialization signal having the prescribed contents is input through the first communication port means, the control means transmits through the second communication port means a piece of information that specifies at least one of a type of image signal supplied externally and a method of signal processing to be applied for the supplied image signal, when the initialization signal having the prescribed contents is not input through the first communication port means, the control means receives through the first communication port means the piece of information that specifies at least one of the type of image signal supplied externally and the method of signal processing to be applied for the supplied image signal and controls a signal processing applied for the supplied image signal according to the received piece of information.

19. A projection display apparatus in accordance with claim 11, further comprising a plurality of image signal input means for receiving image signals, wherein the control means selects an image signal input from one of the plurality of image signal input means and controls projection and display of an image expressed by the selected image signal in response to a command given through the first communication port means.

20. A projection display apparatus in accordance with claim 11, wherein the control means further delays an execution timing of the processing specified by the command given through the first communication port means according to the ID information stored in the storage means.

* * * * *